(12) United States Patent
Hong et al.

(10) Patent No.: US 9,008,164 B2
(45) Date of Patent: Apr. 14, 2015

(54) HDMI SIGNAL ADJUSTING METHOD, HDMI SIGNAL RECEIVING APPARATUS, HDMI SIGNAL TRANSMITTING APPARATUS, AND HDMI SIGNAL PROCESSING SYSTEM

(71) Applicant: Samsung Electronics Co., Ltd., Suwon-si (KR)

(72) Inventors: Seung-se Hong, Yongin-si (KR); Young-jo Seo, Ansan-si (KR); Sung-bo Oh, Seoul (KR); Jun-ho Lim, Dongducheon-si (KR); Hyoung-woo Jeon, Yongin-si (KR); Ki-sung Cha, Gwangmyeong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 13/938,533

(22) Filed: Jul. 10, 2013

(65) Prior Publication Data

US 2014/0016684 A1    Jan. 16, 2014

(30) Foreign Application Priority Data

Jul. 10, 2012    (KR) .................. 10-2012-0075185

(51) Int. Cl.
*H04B 3/46* (2006.01)
*H04L 27/01* (2006.01)
*G09G 5/00* (2006.01)

(52) U.S. Cl.
CPC .............. *H04L 27/01* (2013.01); *G09G 5/006* (2013.01); *G09G 2370/08* (2013.01); *G09G 2370/12* (2013.01); *G09G 2370/00* (2013.01)

(58) Field of Classification Search
CPC .......... G09G 2370/12; G09G 2350/00; G09G 2370/00; G09G 2370/08; G09G 5/006; H04N 21/43635; H04L 27/01; H04L 25/03878; H04L 25/03885; H04L 25/03057; H04L 7/0062; H04L 7/0334; H04L 25/0272; H04L 25/0278; H04L 25/0282
USPC ......... 375/219, 220, 223, 224, 226, 229, 230, 375/267, 271, 286, 295, 316, 346
See application file for complete search history.

(56) References Cited

U.S. PATENT DOCUMENTS 8,457,242 B2 * 6/2013 Kim .............................. 375/295
8,718,127 B2 * 5/2014 Acosta-Serafini et al. ... 375/232

(Continued)

FOREIGN PATENT DOCUMENTS

EP    2 424 153 A1    2/2012

OTHER PUBLICATIONS

Communication dated Nov. 6, 2013 issued by the European Patent Office in counterpart European Patent Application No. 13175816.1.

(Continued)

*Primary Examiner* — Hirdepal Singh
(74) *Attorney, Agent, or Firm* — Sughrue Mion, PLLC

(57) ABSTRACT

An HDMI signal adjusting method is provided. A method for adjusting an HDMI signal of a high definition multimedia interface (HDMI) signal receiving apparatus includes: setting an equalizer gain for an HDMI signal, receiving an HDMI signal which is adjusted according to signal adjustment information set by an HDMI signal transmitting apparatus from the HDMI signal transmitting apparatus, signal-processing the received HDMI signal according to the set equalizer gain, detecting an error rate of the signal-processed HDMI signal, and transmitting signal adjustment information corresponding to an HDMI signal having a lowest error rate from among a plurality of the signal-processed HDMI signals corresponding to a plurality of different combinations of the equalizer gain and the signal adjustment information to the HDMI signal transmitting apparatus.

28 Claims, 19 Drawing Sheets

(56) References Cited

U.S. PATENT DOCUMENTS

| | | | |
|---|---|---|---|
| 2007/0230640 A1* | 10/2007 | Bryan et al. | 375/349 |
| 2009/0190648 A1* | 7/2009 | Sakano et al. | 375/232 |
| 2010/0020179 A1 | 1/2010 | Horan et al. | |
| 2010/0073574 A1* | 3/2010 | Nakajima et al. | 348/723 |
| 2010/0079216 A1* | 4/2010 | Sakano | 333/2 |
| 2010/0289781 A1* | 11/2010 | Kim et al. | 345/206 |
| 2012/0050238 A1 | 3/2012 | Kasahara et al. | |
| 2012/0068995 A1* | 3/2012 | Ozawa et al. | 345/214 |
| 2012/0105732 A1* | 5/2012 | Hsu et al. | 348/730 |

OTHER PUBLICATIONS

Communication, Issued by the European Patent Office, Dated Aug. 27, 2014, in counterpart European Application No. 13 175 816.1.

* cited by examiner

FIG. 2

| No. | Equalizer Mode | Control Value | Gain(dB) |
|---|---|---|---|
| 1 | EQ_Gain_1 | 0x01 | 0dB |
| 2 | EQ_Gain_2 | 0x02 | 1dB |
| 3 | EQ_Gain_3 | 0x03 | 3dB |
| 4 | EQ_Gain_4 | 0x04 | 5dB |
| 5 | EQ_Gain_5 | 0x05 | 6dB |
| 6 | EQ_Gain_6 | 0x06 | 8dB |
| 7 | EQ_Gain_7 | 0x07 | 10dB |
| 8 | EQ_Gain_8 | 0x08 | 12dB |

FIG. 3

| No. | Pre-emphasis Mode | Control Value | Gain(dB) |
|---|---|---|---|
| 1 | Pre-emphasis_Gain_1 | 0x01 | 0dB |
| 2 | Pre-emphasis_Gain_2 | 0x02 | 1.5dB |
| 3 | Pre-emphasis_Gain_3 | 0x03 | 2.0dB |
| 4 | Pre-emphasis_Gain_4 | 0x04 | 3.0dB |
| 5 | Pre-emphasis_Gain_5 | 0x05 | 3.5dB |
| 6 | Pre-emphasis_Gain_6 | 0x06 | 6.0dB |
| 7 | Pre-emphasis_Gain_7 | 0x07 | 9.0dB |
| 8 | Pre-emphasis_Gain_8 | 0x08 | 12dB |

FIG. 4

| No. | TMDS Vswing Mode | Control Value | Swing(mV) |
|---|---|---|---|
| 1 | Swing_Gain_1 | 0x01 | 400mV |
| 2 | Swing_Gain_2 | 0x02 | 450mV |
| 3 | Swing_Gain_3 | 0x03 | 500mV |
| 4 | Swing_Gain_4 | 0x04 | 550mV |
| 5 | Swing_Gain_5 | 0x05 | 600mV |
| 6 | Swing_Gain_6 | 0x06 | 650mV |
| 7 | Swing_Gain_7 | 0x07 | 700mV |
| 8 | Swing_Gain_8 | 0x08 | 800mV |

FIG. 5

ECC Error Count Register

| Dev | Addr | Name | 7 | 6 | 5 | 4 | 3 | 2 | 1 | 0 |
|---|---|---|---|---|---|---|---|---|---|---|
| 0xB0 | 0x68 | ECC_ERR0 | ECC_ERR [7.0] | | | | | | | |
| | 0x68 | ECC_ERR1 | ECC_ERR [15.8] | | | | | | | |
| Bit | Label | R/W | DESCRIPTION | | | | | | | Default |
| 15:0 | 0x68 | R/W | Current number of ECC errors | | | | | | | 0 |

HDMI SIGNAL ADJUSTING METHOD, HDMI SIGNAL RECEIVING APPARATUS, HDMI SIGNAL TRANSMITTING APPARATUS, AND HDMI SIGNAL PROCESSING SYSTEM

CROSS-REFERENCE TO RELATED APPLICATION

This application claims priority from Korean Patent Application No. 10-2012-0075185, filed on Jul. 10, 2012, in the Korean Intellectual Property Office, the disclosure of which is incorporated herein by reference in its entirety.

BACKGROUND

1. Field

Methods and apparatuses consistent with exemplary embodiments relate to high definition multimedia interface (HDMI) signal processing, and more particularly, to an HDMI signal adjusting method which adjusts a signal of an HDMI apparatus, an HDMI signal receiving apparatus, an HDMI signal transmitting apparatus, and an HDMI signal processing system.

2. Description of the Related Art

HDMI is a digital video/audio interface standard which uses a non-compression method. HDMI provides an interface between a multimedia source which supports HDMI, such as a set-top box or a digital versatile disk (DVD) player, and an apparatus such as an (audio/video) AV apparatus, a monitor, or a digital television.

HDMI transmits high definition multimedia information using a high frequency signal. An HDMI signal generally has a frequency characteristic of 300-600 Mhz. However, it is difficult to discriminate between noise and a signal in the band of 300-600 Mhz, and thus, there is a problem that it is difficult to remove noise during the transmission of an HDMI signal. Further, if there is a problem in connecting an HDMI cable or if the cable is overly elongated, the problems of noise and signal leakage become more serious.

In order to minimize the noise of an HDMI signal, the HDMI signal is generally adjusted at the product releasing stage. That is, an equalizer gain or a pre-emphasis gain is adjusted to be consistent with a characteristic of hardware at the releasing stage of a transmitting end which generates and transmits an HDMI signal (for example, a DVD player or a step-top box), and to further be consistent with a characteristic of hardware at a receiving end which receives and reproduces the HDMI signal (for example, a TV). However, since the problems of noise and signal leakage become more serious according to a connection state of the HDMI cable as described above, it is necessary to adjust the HDMI signal considering a setting environment of an HDMI apparatus.

In particular, there is a demand for a method of providing an optimal HDMI signal exchanging condition by adjusting an HDMI signal in a simple fashion when a consumer directly connects HDMI apparatuses.

SUMMARY

One or more exemplary embodiments may overcome the above disadvantages and other disadvantages not described above. However, it is understood that one or more exemplary embodiments are not required to overcome the disadvantages described above, and may not overcome any of the problems described above.

One or more exemplary embodiments provide an HDMI signal adjusting method, which enables a user to adjust a signal easily and in a simple fashion when a consumer directly connects HDMI apparatuses, an HDMI signal receiving apparatus, an HDMI signal transmitting apparatus, and an HDMI signal processing system.

According to an aspect of an exemplary embodiment, there is provided a method for adjusting a high definition multimedia interface (HDMI) signal of an HDMI signal receiving apparatus, the method including: setting an equalizer gain for an HDMI signal, receiving an HDMI signal which is adjusted according to signal adjustment information set by an HDMI signal transmitting apparatus from the HDMI signal transmitting apparatus, signal-processing the received HDMI signal according to the set equalizer gain, detecting an error rate of the signal-processed HDMI signal, and transmitting signal adjustment information corresponding to an HDMI signal having a lowest error rate from among a plurality of the signal-processed HDMI signals corresponding to a plurality of different combinations of the equalizer gain and the signal adjustment information to the HDMI signal transmitting apparatus.

The setting the equalizer gain may include setting the equalizer gain by changing the equalizer gain by adjusting an equalizer gain level in sequence.

The HDMI signal may be adjusted by changing at least one of a pre-emphasis gain and a transition minimized differential signaling (TMDS) swing gain.

The method may further include transmitting a signal adjustment request to the HDMI signal transmitting apparatus, wherein the transmitting of the signal adjustment request causes the HDMI signal transmitting apparatus to adjust the HDMI signal.

The detecting the error rate may include detecting the error rate by counting a TMDS error.

The TMDS error may be at least one of a Bose, Chaudri, Hocquenghem Code (BCH) error and an error check and correct memory (ECC) error.

The method may further include storing, for each combination of the equalizer gain and the signal adjustment information, the equalizer gain, the signal adjustment information, and the error rate corresponding to the signal adjustment information. The transmitting may include transmitting the signal adjustment information corresponding to the lowest error rate from among the stored error rates to the HDMI signal transmitting apparatus.

The method may further include, when the lowest error rate detected from the signal-processed HDMI signals is greater than or equal to a predetermined value, outputting a message requesting replacement of an HDMI cable which transmits the HDMI signal.

According to an aspect of another exemplary embodiment, there is provided a method for adjusting a high definition multimedia interface (HDMI) signal of an HDMI signal transmitting apparatus, the method including: setting signal adjustment information, adjusting an HDMI signal according to the set signal adjustment information, transmitting the adjusted HDMI signal to an HDMI signal receiving apparatus, receiving signal adjustment information corresponding to an HDMI signal having a lowest error rate among a plurality of the HDMI signals from the HDMI signal receiving apparatus, and adjusting the HDMI signal according to the received signal adjustment information.

The HDMI signal may be adjusted by changing at least one of a pre-emphasis gain and a transition minimized differential signaling (TMDS) swing gain.

The error rate may be detected by counting at least one of a Bose, Chaudri, Hocquenghem Code (BCH) error and an error check and correct memory (ECC) error.

According to an aspect of still another exemplary embodiment, there is provided a method for adjusting a high definition multimedia interface (HDMI) signal, the method including: setting, by an HDMI signal receiving apparatus, an equalizer gain for an HDMI signal, transmitting, by the HDMI signal receiving apparatus, a signal adjustment request to an HDMI signal transmitting apparatus, in response to receiving the signal adjustment request, setting, by the HDMI signal transmitting apparatus, signal adjustment information, adjusting, by the HDMI signal transmitting apparatus, an HDMI signal according to the set signal adjustment information, transmitting, by the HDMI signal transmitting apparatus, the adjusted HDMI signal to the HDMI signal receiving apparatus, signal-processing, by the HDMI signal receiving apparatus, the transmitted HDMI signal according to the set equalizer gain, detecting, by the HDMI signal receiving apparatus, an error rate of the signal-processed HDMI signal, transmitting, by the HDMI signal receiving apparatus, the signal adjustment information corresponding to an HDMI signal having a lowest error rate from among a plurality of the signal-processed HDMI signals corresponding to a plurality of different combinations of the equalizer gain and the signal adjustment information to the HDMI signal transmitting apparatus, and adjusting, by the HDMI signal transmitting apparatus, the HDMI signal according to the transmitted signal adjustment information.

The adjusting the HDMI signal may include adjusting the HDMI signal by changing at least one of a pre-emphasis gain and a transition minimized differential signaling (TMDS) swing gain.

According to an aspect of still another exemplary embodiment, there is provided a high definition multimedia interface (HDMI) signal receiving apparatus including: an equalizer (EQ) adjuster which sets an equalizer gain for an HDMI signal, a communication interface unit which receives an HDMI signal which is adjusted according to signal adjustment information set by an HDMI signal transmitting apparatus from the HDMI signal transmitting apparatus, a signal processor which signal-processes the HDMI signal received through the communication interface unit according to the equalizer gain set by the EQ adjuster, an error detector which detects an error rate of the signal-processed HDMI signal, and a controller which controls the communication interface unit to transmit the signal adjustment information corresponding to an HDMI signal having a lowest error rate detected by the error detector from among a plurality of the signal-processed HDMI signals corresponding to a plurality of different combinations of the equalizer gain and the signal adjustment information to the HDMI signal transmitting apparatus.

The EQ adjuster may set the equalizer gain by changing the equalizer gain by adjusting an equalizer gain level in sequence.

The communication interface unit may receive the HDMI signal which is adjusted by changing at least one of a pre-emphasis gain and a transition minimized differential signaling (TMDS) swing gain.

The HDMI signal receiving apparatus may further include a storage unit which stores, for each combination of the equalizer gain and the signal adjustment information, the equalizer gain, the signal adjustment information, and the error rate corresponding to the signal adjustment information, and the controller may control the communication interface unit to transmit the signal adjustment information corresponding to the lowest error rate from among the stored error rates to the HDMI signal transmitting apparatus.

The HDMI signal receiving apparatus may further include a display unit, and, when the lowest error rate detected from the signal-processed HDMI signals is greater than or equal to a predetermined value, the controller may control the display unit to output a message requesting replacement of an HDMI cable which transmits the HDMI signal.

According to an aspect of still another exemplary embodiment, there is provided a high definition multimedia interface (HDMI) signal transmitting apparatus including: a communication interface unit which exchanges information with an HDMI signal receiving apparatus, a signal adjuster which, when a signal adjustment request is received from the HDMI signal receiving apparatus through the communication interface unit, adjusts an HDMI signal, and a controller which controls the communication interface unit to transmit the HDMI signal adjusted by the signal adjuster to the HDMI signal receiving apparatus, and, when signal adjustment information corresponding to an HDMI signal having a lowest error rate from among a plurality of HDMI signals is received from the HDMI signal receiving apparatus, controls the signal adjuster to adjust the HDMI signal according to the received signal adjustment information.

According to an aspect of still another exemplary embodiment, there is provided an HDMI signal processing system including: an HDMI signal receiving apparatus which sets an equalizer gain for an HDMI signal, receives an adjusted HDMI signal from an HDMI signal transmitting apparatus, signal-processes the received HDMI signal according to the set equalizer gain, and transmits signal adjustment information corresponding to an HDMI signal having a lowest error rate from among a plurality of the signal-processed HDMI signals corresponding to a plurality of different combinations of the equalizer gain and the signal adjustment information to the HDMI signal transmitting apparatus, and the signal transmitting apparatus which adjusts the HDMI signal and transmits the HDMI signal to the HDMI signal receiving apparatus, adjusts the HDMI signal according to the signal adjustment information corresponding to the HDMI signal having the lowest error rate, and re-transmits the HDMI signal to the HDMI signal receiving apparatus.

According to an aspect of yet another exemplary embodiment, a method for determining an optimal high definition multimedia interface (HDMI) signal includes: changing, at an HDMI transmitter, a characteristic of each of a plurality of HDMI signals to generate a plurality of unique HDMI signals; transmitting the plurality of unique HDMI signals from the HDMI transmitter to an HDMI receiver; determining, at the HDMI receiver, an optimal HDMI signal from among the plurality of transmitted unique HDMI signals; and transmitting information related to the optimal HDMI signal from the HDMI receiver to the HDMI transmitter.

According to an aspect of still another exemplary embodiment, a method for determining an optimal high definition multimedia interface (HDMI) signal includes: processing, at an HDMI receiver, a plurality of HDMI signals according to a corresponding plurality of equalizer gain values; determining, at the HDMI receiver, an optimal HDMI signal from among the plurality of processed HDMI signals; and transmitting information related to the optimal HDMI signal from the HDMI receiver to an HDMI transmitter.

According to various exemplary embodiments described above, an automatic signal adjusting function is provided in an HDMI apparatus, so that a user can easily adjust the signal and set an optimal signal exchanging environment without resolution deterioration.

BRIEF DESCRIPTION OF THE DRAWING FIGURES

The above and/or other aspects will be more apparent by describing in detail exemplary embodiments, with reference to the accompanying drawings, in which:

FIG. 2 is a reference view illustrating setting values of an equalizer gain according to an exemplary embodiment;

FIG. 3 is a reference view illustrating setting values of a pre-emphasis gain according to an exemplary embodiment;

FIG. 4 is a reference view illustrating setting values of a transition minimized differential signaling (TMDS) swing gain according to an exemplary embodiment;

FIG. 5 is a reference view illustrating information provided by a register which counts an error detected by an error check and correct memory error (ECC) memory and stores the error according to an exemplary embodiment;

DETAILED DESCRIPTION OF EXEMPLARY EMBODIMENTS

Figure 1:
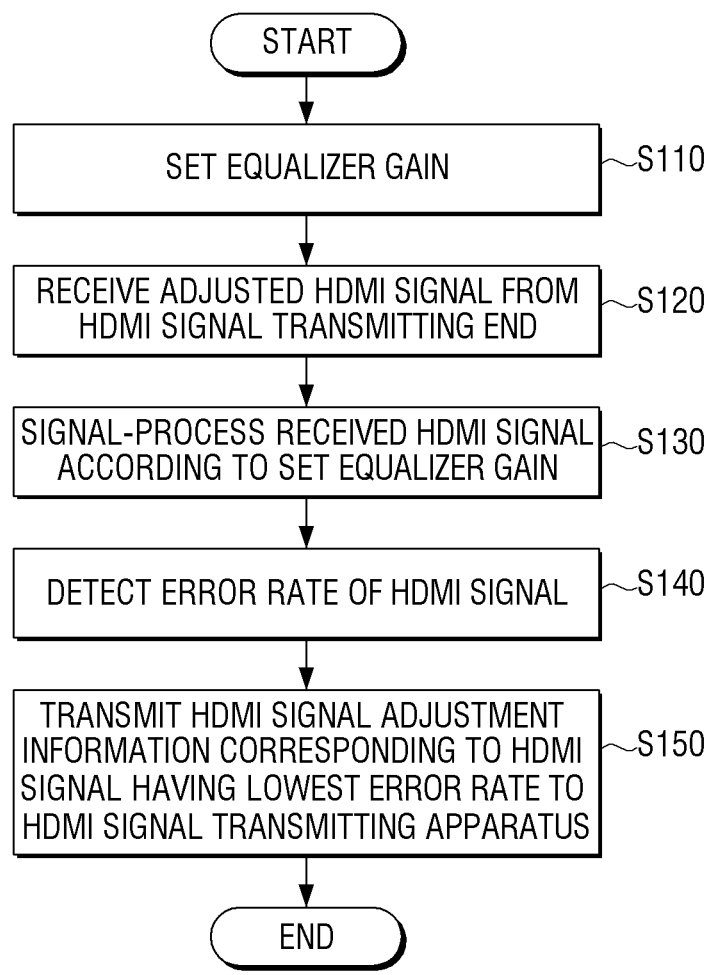
FIG. 1 is a flowchart illustrating an HDMI signal adjusting method according to an exemplary embodiment.

Hereinafter, exemplary embodiments will be described in greater detail with reference to the accompanying drawings.

In the following description, the same reference numerals are used for the same elements when they are depicted in different drawings. The matters defined in the description, such as a detailed construction and elements, are provided to assist in a comprehensive understanding of exemplary embodiments. Thus, it is apparent that exemplary embodiments can be carried out without those specifically defined matters. Also, functions or elements known in the related art are not described in detail since they would obscure the exemplary embodiments with unnecessary detail.

FIG. 1 is a flowchart illustrating an HDMI signal adjusting method according to an exemplary embodiment.

Referring to FIG. 1, the HDMI signal adjusting method according to an exemplary embodiment includes setting an equalizer gain at operation S110, receiving an HDMI signal which is adjusted from an HDMI signal transmitting apparatus at operation S120, signal-processing the received HDMI signal at operation S130, detecting an error rate of the signal-processed HDMI signal at operation S140, and transmitting signal adjustment information having a lowest error rate to the HDMI signal transmitting apparatus at operation S150.

According to an exemplary embodiment, when an HDMI signal transmitting end (e.g., a DVD player, a step-top box, etc.) and an HDMI signal receiving end (e.g., a TV, a laptop, etc.) are connected to each other through an HDMI cable, the HDMI signal receiving end sets an equalizer gain first at operation S110. The equalizer gain may be set by changing the equalizer gain by adjusting an equalizer gain level in sequence. In order to adjust an HDMI signal, the equalizer gain may be set to an initial value. A corresponding HDMI signal is detected by increasing the equalizer gain level from the initial value in sequence.

According to an exemplary embodiment, the equalizing operation disclosed herein includes an operation of reinforcing or cutting the HDMI signal received from the HDMI signal transmitting end, and also includes an operation of adjusting a bias signal or changing a charge pump value. In particular, the equalizing gain is related to adjusting jitter. An HDMI signal generally has a characteristic of a high frequency, and it is known that a jitter phenomenon in which a wave deviates or is displaced becomes more serious at a high frequency. The jitter may cause flicker of a display monitor, may affect processor performance of a PC which affects the ability of the PC to perform a job as desired, may cause a rattling sound in an audio signal, and may cause a loss of data which is exchanged between network equipment. The jitter phenomenon may be reduced by adjusting sensitivity of a phase locked loop (PLL) by changing a setting of the equalizer gain.

FIG. 2 is a reference view illustrating setting values of an equalizer gain according to an exemplary embodiment.

The HDMI signal receiving end may set an equalizer gain as shown in FIG. 2. For example, EQ_Gain_1 is set to obtain a signal magnitude of 0 dB by applying 0x01 to a register. In the next stage for increasing the equalizer gain level (corresponding to EQ_Gain_2), a signal magnitude of 1 dB is obtained by applying 0x02 to the register. In this way, the magnitude of the signal is changed by increasing the level of the equalizer gain in sequence. However, the values shown in FIG. 2 are merely examples, and the control values and the resulting signal magnitudes (gains) may be set differently. Also, the level may be set by a larger number of stages or a smaller number of stages than the number of stages shown in FIG. 2.

The HDMI signal transmitting end includes all kinds of apparatuses that can generate and transmit an HDMI signal. For example, the HDMI signal transmitting end may be implemented as various types of apparatuses, such as a computer, a DVD player, a television (TV), a mobile phone, a personal digital assistant (PDA), a notebook PC, a monitor, a tablet PC, an e-book, an e-album, and a kiosk. It is understood that the HDMI signal transmitting end may further be implemented as many other types of apparatuses as well, including combinations of the above apparatuses.

The HDMI signal receiving end include all kinds of apparatuses that can receive an HDMI signal from an HDMI signal transmitting end and reproduce the HDMI signal. For example, the HDMI signal receiving end may be implemented as various types of apparatuses such as a computer, a DVD player, a television, a mobile phone, a PDA, a notebook PC, a monitor, a tablet PC, an e-book, an e-album, and a kiosk. It is understood that the HDMI signal receiving end may further be implemented as many other types of apparatuses as well, including combinations of the above apparatuses.

After the equalizer gain is set, the HDMI signal transmitting end performs necessary signal adjusting. The signal adjusting may be performed by changing at least one of a pre-emphasis gain and a transition minimized differential signaling (TMDS) swing gain.

When a specific part of the HDMI signal is lost or attenuated, the corresponding part of the HDMI signal may be amplified by setting the pre-emphasis gain. The HDMI signal transmitting end transmits the HDMI signal which is adjusted by setting the pre-emphasis gain to the HDMI signal receiving end. It is common that the pre-emphasis gain is set when the HDMI signal transmitting end, such as, for example, a DVD player, is released from a factory. Therefore, the pre-emphasis gain is rarely changed in an environment in which the HDMI signal transmitting end (e.g., DVD player) is being used, except when the HDMI signal transmitting end product is repaired. The HDMI signal transmitting end adjusts the HDMI signal which is generated consistently according to a pre-set pre-emphasis gain value, and transmits the adjusted HDMI signal to the HDMI signal receiving end. However, when an HDMI cable is newly connected, there is a problem that the HDMI signal is not optimized for the HDMI signal transmitting environment and thus it is necessary to optimize the HDMI signal. The exemplary embodiments disclosed herein provide a method which, when an HDMI cable is newly connected, changes a pre-emphasis gain and adjusts an HDMI signal, determines an HDMI signal of an optimized quality from among the adjusted HDMI signals, and sets an HDMI signal transmitting condition.

FIG. 3 is a reference view illustrating setting values of a pre-emphasis gain according to an exemplary embodiment.

The HDMI signal transmitting end may set a pre-emphasis gain as shown in FIG. 3. For example, Pre-emphasis_Gain_2 is set to obtain a signal magnitude of 1.5 dB by applying 0x02 to a register. In the next stage (corresponding to Pre-emphasis_Gain_3) for increasing the pre-emphasis level, a signal magnitude of 2.0 dB is obtained by applying 0x03 to the register. In this way, the signal magnitude is changed by increasing the level of the pre-emphasis gain. However, the values shown in FIG. 3 are merely examples, and the control values and the resulting signal magnitudes (gains) may be set differently. Also, the pre-emphasis level may be set by a larger number of stages or a smaller number of stages than the number of stages shown in FIG. 3.

Similarly, when the HDMI signal is lost or attenuated, the HDMI signal may be amplified by setting a transition minimized differential signaling (TMDS) swing gain. The TMDS swing gain is different from the pre-emphasis gain in that the entire signal is amplified by setting the TMDS swing gain.

TMDS is a data transmitting method which transmits video data, audio data and other data using one of three modes, 'video data period', 'data sum period', and 'control period'. The 'video data period' enables the video data to be transmitted, the 'data sum period' enables the audio data and other data to be transmitted through a plurality of packets, and the 'control period' enables a control signal to be transmitted between the 'video data period' and the 'data sum period'.

The HDMI signal transmitting end transmits the HDMI signal which is adjusted by setting the TMDS swing gain to the HDMI signal receiving end. It is common that the TMDS swing gain is set when an HDMI signal transmitting end, such as, for example, a DVD player, is released from a factory. Therefore, the TMDS swing gain is rarely changed in an environment in which the HDMI signal transmitting end (e.g., DVD player) is used, except when the HDMI signal transmitting end product is repaired. The HDMI signal transmitting end adjusts an HDMI signal which is generated consistently according to a pre-set TMDS swing gain value, and transmits the adjusted HDMI signal to the HDMI signal receiving end. However, when an HDMI cable is newly connected, there is a problem that the HDMI signal is not optimized for the HDMI signal transmitting environment and thus it is necessary to optimize the HDMI signal. The exemplary embodiments disclosed herein provide a method which, when an HDMI cable is newly connected, changes a TMDS swing gain and adjusts an HDMI signal, determines an HDMI signal of an optimized quality from among the adjusted HDMI signals, and sets an HDMI signal transmitting condition.

FIG. 4 is a reference view illustrating setting values of a TMDS swing gain according to an exemplary embodiment.

The HDMI signal transmitting end may set a TMDS swing gain as shown in FIG. 4. For instance, Swing_Gain_3 is set to obtain a signal magnitude of 500 mV by applying 0x03 to a register. In the next stage for increasing the TMDS swing gain level (corresponding to TMDS_Swing_Gain_4), a signal magnitude of 550 mV is obtained by applying 0x04 to the register. In this way, the magnitude of the HDMI signal is changed by increasing the level of the TMDS swing gain in sequence. However, the values shown in FIG. 4 are merely examples, and the control values and the resulting signal magnitudes (gains) may be set differently. Also, the level may be set by a larger number of stages or a smaller number of stages than the number of stages shown in FIG. 4.

After the HDMI signal receiving end receives the HDMI signal which is adjusted from the HDMI signal transmitting end at operation S120), the HDMI signal receiving end signal-processes the HDMI signal according to the set equalizer gain at operation S130. As a result, the HDMI signal which is generated by the HDMI signal transmitting end is signal-processed according to settings of the pre-emphasis gain and/or the TMDS swing gain, and is then transmitted to the HDMI signal receiving end, and the HDMI signal receiving end signal-processes the HDMI signal according to the equalizer gain and completes a series of signal processing operations.

Next, at operation S140, the HDMI signal receiving end detects an error rate of the HDMI signal which is signal-processed as described above. The error rate depends on a degree of loss which is caused during the HDMI signal transmitting process with reference to an initially generated signal. In an exemplary embodiment, the error rate may be detected by counting a TMDS error. The method for counting the TMDS may be implemented in various ways, including, for example, a method for detecting a Bose, Chaudri, Hocquenghem Code (BCH) error of the HDMI signal or detecting an error check and correct memory (ECC) error.

FIG. 5 is a reference view illustrating information provided by a register which counts errors detected by an ECC memory and stores the errors, according to an exemplary embodiment. In general, the ECC memory detects an error when an over-current is generated around the memory or when a bit value is changed due to other external influences. FIG. 5 illustrates a result of counting bits in which an ECC error is detected as information of 2 bytes by the ECC memory.

The HDMI signal receiving end finds an HDMI signal of a lowest error rate from among a plurality of signal-processed HDMI signals by repeating the signal processing operation and the error rate detecting operation described above for a plurality of HDMI signals. Similarly, the HDMI signal transmitting end also repeats the operations performed by the HDMI signal transmitting end described above, for the plurality of HDMI signals. The HDMI signal receiving end transmits signal adjustment information corresponding to the found HDMI signal to the HDMI signal transmitting end at operation S150. As described above, the signal adjustment information may be a set pre-emphasis gain and/or a TMDS swing gain. In this case, the setting values of the pre-emphasis gain and/or the TMDS swing gain are transmitted to the HDMI signal transmitting end.

Figure 6:
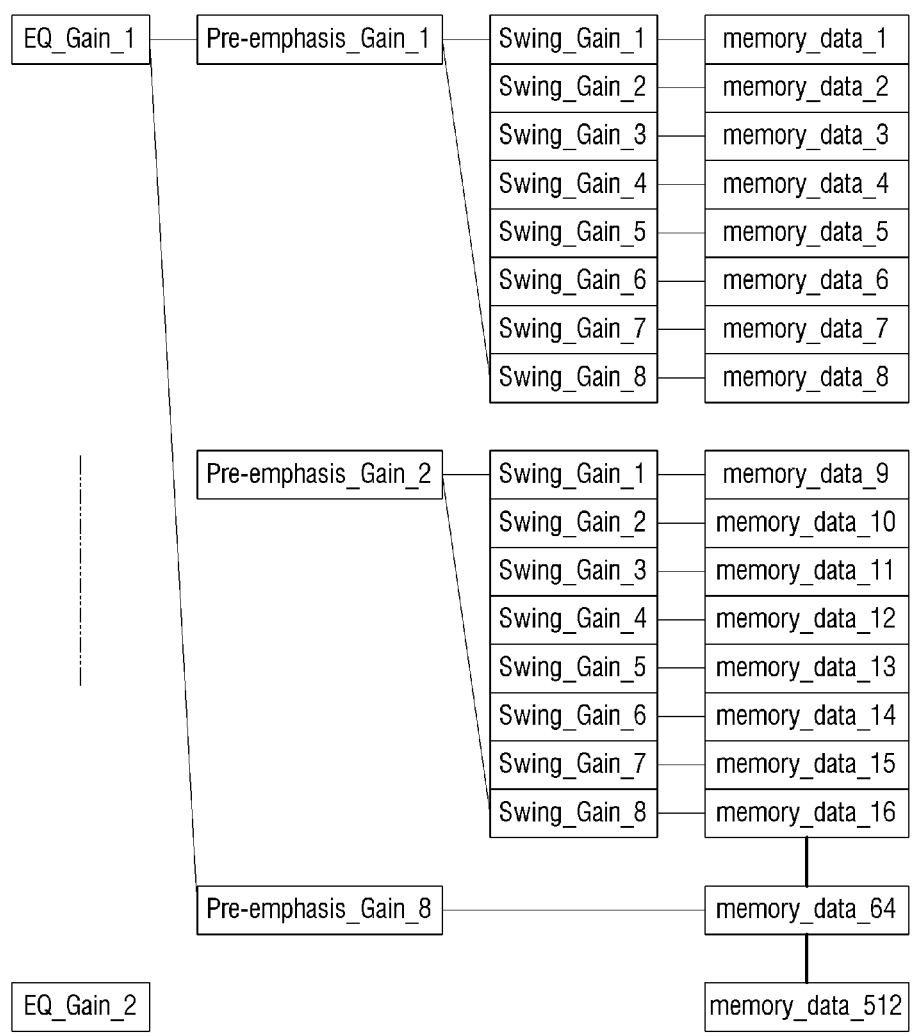
FIG. 6 is a reference view illustrating an example of a table which is generated by performing a signal processing operation and an error detecting operation according to an exemplary embodiment.

When the signal processing operation and the error rate detecting operation are repeated as described above, a table containing the signal adjustment information set in each operation and an error rate corresponding to the signal adjustment information may be generated. The HDMI signal receiving end identifies the signal adjustment information having the lowest error rate with reference to the generated table. FIG. 6 illustrates an example of such a table according to an exemplary embodiment.

That is, FIG. 6 is a reference view illustrating an example of a table which is generated by performing the signal processing operation and the error detecting operation.

Referring to FIG. 6, error rates which are obtained when the equalizer gain level is 1, the pre-emphasis gain level is 1, and the TMDS swing gain levels are 1 to 8 are stored in a memory. Then, error rates which are obtained when the equalizer gain level is 1, the pre-emphasis gain level is 2, and the TMDS swinging gain levels are 1 to 8 are stored in the memory. This process may be continued for each of the combinations of equalizer gain levels, pre-emphasis gain levels and TDMS swing gain levels. In this manner, the error rates are checked by combining the setting values of the equalizer gain, the pre-emphasis gain, and the TMDS swing gain in sequence. The HDMI signal receiving end identifies the signal adjustment information having the lowest error rate (corresponding to an optimal HDMI signal) stored in the memory with reference to the combinations stored in the table of FIG. 6.

Figure 7:
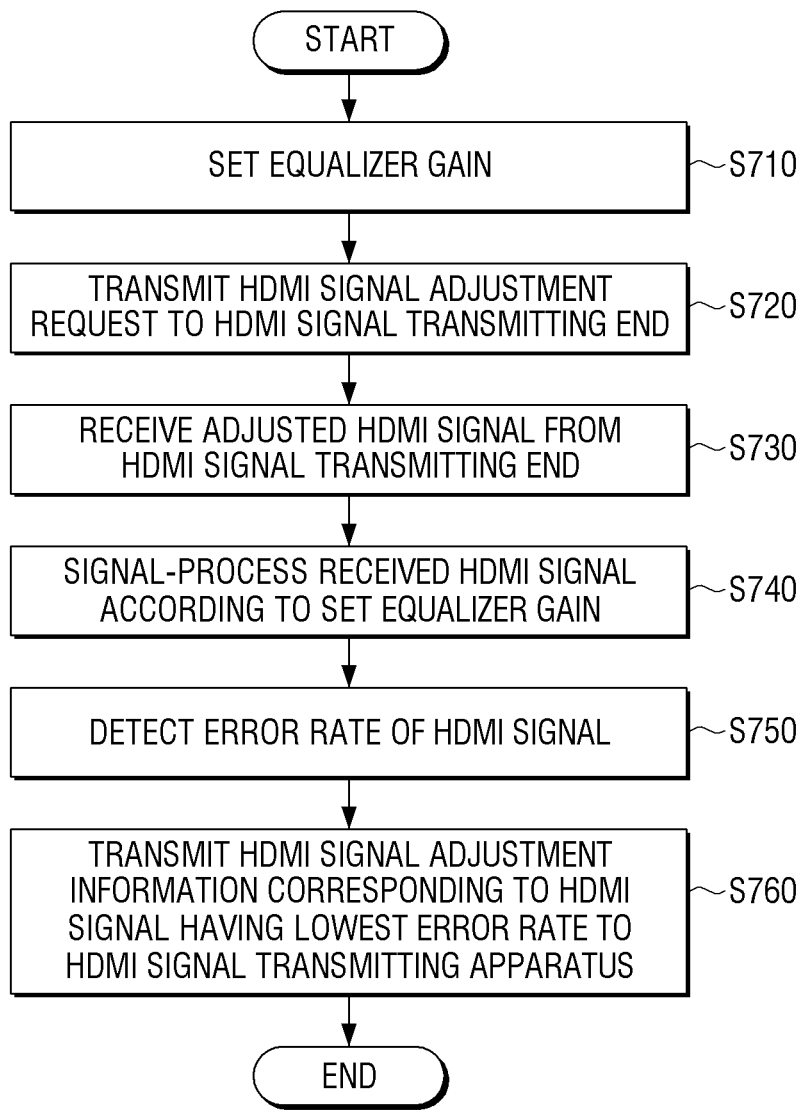
FIG. 7 is a flowchart illustrating an HDMI signal adjusting method according to another exemplary embodiment.

FIG. 7 is a flowchart illustrating an HDMI signal adjusting method according to another exemplary embodiment.

Referring to FIG. 7, in comparison with the method shown in FIG. 1, an HDMI signal adjusting method according to another exemplary embodiment further includes transmitting a signal adjustment request to the HDMI signal transmitting end at operation S720. Specifically, the HDMI signal adjusting method shown in FIG. 7 includes setting an equalizer gain at operation S710, transmitting an HDMI signal adjustment request to the HDMI signal transmitting apparatus at operation S720, receiving an HDMI signal which is adjusted according to the signal adjustment request from the HDMI signal transmitting apparatus at operation S730, signal-processing the received HDMI signal at operation S740, detecting an error rate of the signal-processed HDMI signal at operation S750, and transmitting signal adjustment information having a lowest error rate to the HDMI signal transmitting apparatus at operation S760.

When the signal adjustment request is transmitted at operation S720 as described above, the HDMI signal transmitting end sets signal adjustment information, adjusts the HDMI signal according to the set signal adjustment information, and transmits the HDMI signal to the HDMI signal receiving end. Then, the HDMI signal receiving end signal-processes the received HDMI signal according to the set equalizer gain and detects an error rate of the signal-processed HDMI signal, and repeats the above-described operation by changing a signal adjustment value. In this case, a table containing the signal adjustment information set in each operation and the error rate corresponding to the signal adjustment information is generated. The HDMI signal receiving end identifies the signal adjustment information having the lowest error rate with reference to the table.

Figure 8:
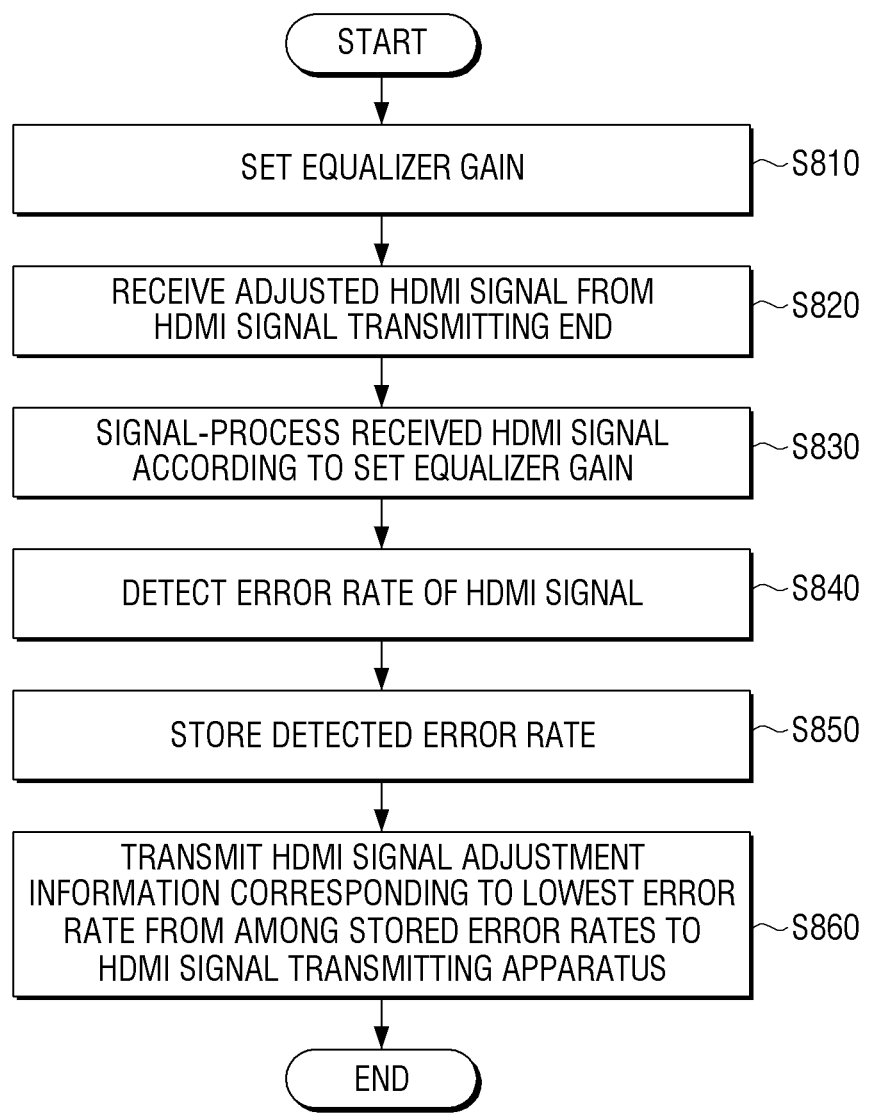
FIG. 8 is a flowchart illustrating an HDMI signal adjusting method according to still another exemplary embodiment.

FIG. 8 is a flowchart illustrating an HDMI signal adjusting method according to still another exemplary embodiment.

Referring to FIG. 8, in comparison with the method shown in FIG. 1, an HDMI signal adjusting method according to still another exemplary embodiment further includes storing an equalizer gain, signal adjustment information, and an error rate corresponding to the signal adjustment information at operation S850.

That is, as described above, a table containing the signal adjustment information which is set by repeating the signal processing operation and the error rate detecting operation, and the error rate corresponding to the signal adjustment information is generated, and is stored in a storage unit at operation S850. For example, the signal adjustment information and the error rates corresponding to the signal adjustment information set as shown in FIG. 6 may be stored in a memory. The HDMI signal receiving end identifies signal adjustment information having a lowest error rate with reference to the table stored in the memory. Also, the signal adjustment information corresponding to the lowest error rate from among the stored error rates is transmitted to the HDMI signal transmitting apparatus.

Figure 9:
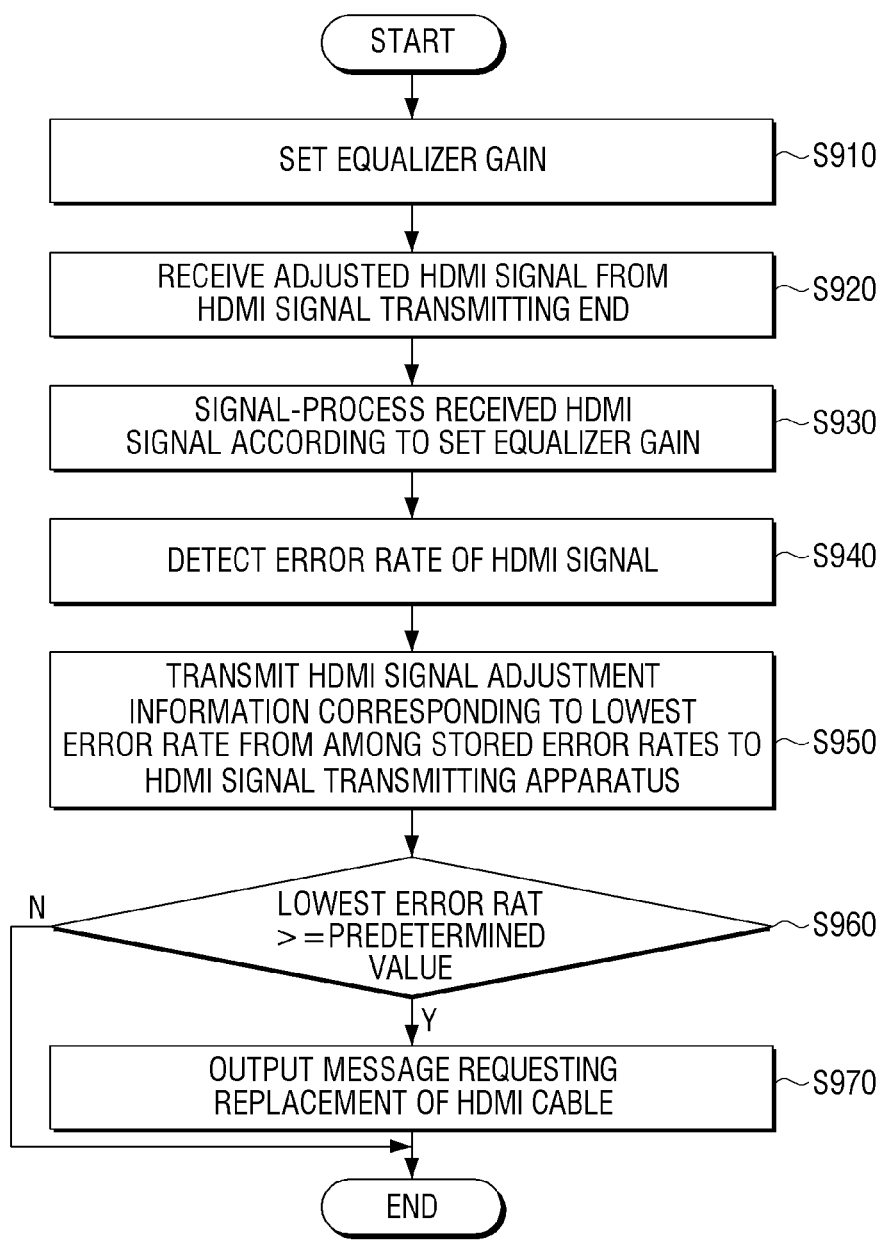
FIG. 9 is a flowchart illustrating an HDMI signal adjusting method according to still another exemplary embodiment.

Even when the signal adjustment information corresponding to the lowest error rate is identified through the above-described process, this error rate may not guarantee a minimum quality which is required by the HDMI signal receiving end. For example, when the HDMI cable is excessively elongated for connection or when signal leakage is severe due to deterioration of the HDMI cable or other components, even the lowest error rate may not guarantee high quality. In this case, it is necessary to inform a user that the HDMI cable should be replaced or newly installed. FIG. 9 suggests still another exemplary embodiment to solve this problem.

FIG. 9 is a flowchart illustrating an HDMI signal adjusting method according to still another exemplary embodiment.

Referring to FIG. 9, in comparison with the method shown in FIG. 1, an HDMI signal adjusting method according to still another exemplary embodiment further includes determining whether a lowest error rate detected from a signal-processed HDMI signal is greater than or equal to a predetermined value at operation S960, and if so, outputting a message requesting replacement of an HDMI cable at operation S970.

According to an exemplary embodiment, when the HDMI signal receiving end is a TV, and when the lowest error rate detected from the signal-processed HDMI signal is greater than or equal to a predetermined value, a message indicating that the HDMI cable is required to be replaced is displayed on a screen of the TV.

In this case, the HDMI signal adjusting method includes setting an equalizer gain at operation S910, receiving an HDMI signal which is adjusted from the HDMI signal transmitting apparatus at operation S920, signal-processing the received HDMI signal at operation S930, detecting an error rate of the signal-processed HDMI signal at operation S940, transmitting signal adjustment information of a lowest error rate to the HDMI signal transmitting apparatus at operation S950, and, when the lowest error rate detected from the signal-processed HDMI signal is determined to be greater than or equal to a predetermined value at operation S960 (S960-Y), outputting a message requesting replacement of an HDMI signal at operation S970.

Figure 10:
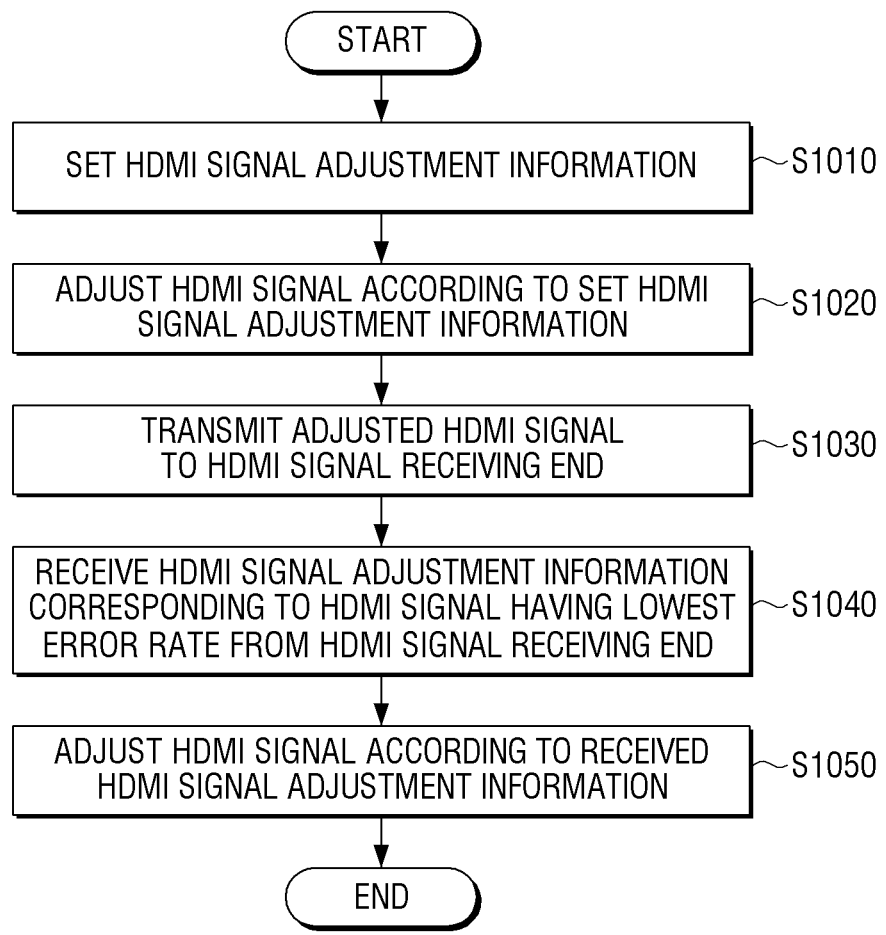
FIG. 10 is a flowchart illustrating an HDMI signal adjusting method according to still another exemplary embodiment.

FIG. 10 is a flowchart illustrating an HDMI signal adjusting method according to still another exemplary embodiment.

Referring to FIG. 10, an HDMI signal adjusting method according to still another exemplary embodiment includes setting signal adjustment information at operation S1010, adjusting an HDMI signal according to the set signal adjustment information at operation S1020, transmitting the adjusted HDMI signal to the HDMI signal receiving apparatus at operation S1030), receiving signal adjustment information corresponding to an HDMI signal having a lowest error rate from the HDMI signal receiving apparatus at operation S1040, and adjusting the HDMI signal according to the received signal adjustment information at operation S1050. According to an exemplary embodiment, the above-described series of operations are performed by the HDMI signal transmitting end.

When a signal adjustment request is received from the HDMI signal receiving end, the HDMI signal transmitting end sets signal adjustment information at operation S1010.

The HDMI signal transmitting end adjusts an HDMI signal according to the set signal adjustment information at operation S1020. As described above, the HDMI signal is adjusted by changing at least one of a pre-emphasis gain and/or a TMDS swing gain. The adjusted HDMI signal is transmitted to the HDMI signal receiving end at operation S1030.

After that, the HDMI signal receiving end signal-processes the HDMI signal which is received from the HDMI signal transmitting end according to the set equalizer gain, detects an error rate, and generates an error rate table in which an error rate is changed according to signal adjustment information by repeating the signal processing operation and the error rate detecting operation. The HDMI signal receiving end transmits signal adjustment information corresponding to an HDMI signal of a lowest error rate, and the HDMI signal transmitting end receives the transmitted signal adjustment information at operation S1040.

Then, at operation S1050, the HDMI signal transmitting end re-sets the signal adjustment information to be consistent with the received signal adjustment information, adjusts the HDMI signal according to the re-set signal adjustment information and transmits the HDMI signal to the HDMI signal receiving end until the HDMI cable is disconnected.

Figure 11:
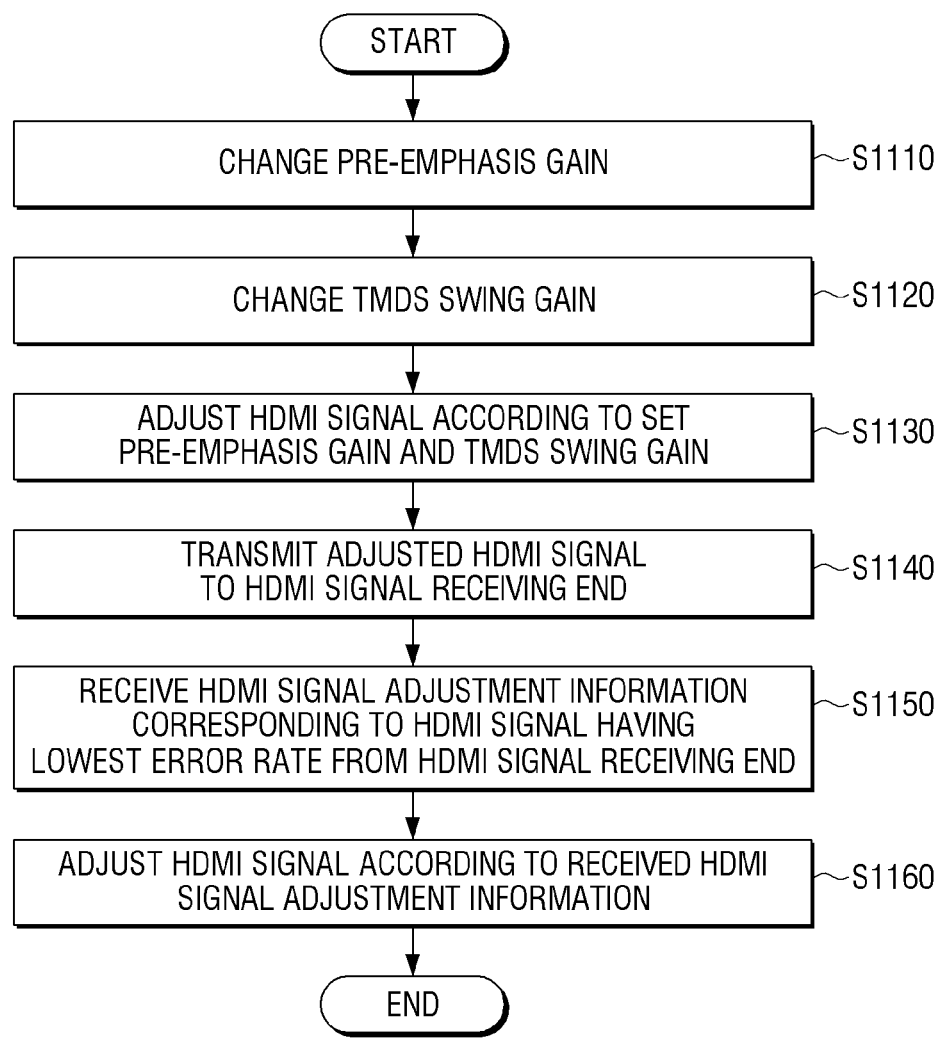
FIG. 11 is a flowchart illustrating an HDMI signal adjusting method according to still another exemplary embodiment.

FIG. 11 is a flowchart illustrating an HDMI signal adjusting method according to still another exemplary embodiment.

Referring to FIG. 11, in an HDMI signal adjusting method according to still another exemplary embodiment, the setting of the signal adjustment information described above may be performed by setting (changing) at least one of a pre-emphasis gain and a TMDS swing gain when a signal adjustment request is received from the HDMI signal receiving end, at operations S1110 and S1120.

When, for example, the HDMI signal transmitting end sets both the pre-emphasis gain at operation S1110 and the TMDS swing gain at operation S1120, the HDMI signal transmitting end adjusts the HDMI signal according to the set pre-emphasis gain and TMDS swing gain at operation S1130, and transmits the HDMI signal to the HDMI signal receiving end at operation S1140. After that, the HDMI signal receiving end signal-processes the HDMI signal received from the HDMI signal transmitting end according to a set equalizer gain and detects an error rate, and generates an error rate table in which an error rate is changed according to an equalizer gain and signal adjustment information by repeating the signal processing operation and the error rate detecting operation. The HDMI signal receiving end re-transmits the signal adjustment information corresponding to an HDMI signal of a lowest error rate, the re-transmitted signal adjustment information being usable to set at least one of values of the pre-emphasis gain and the TMDS swing gain, to the HDMI signal transmitting end at operation S1150.

The HDMI signal transmitting end re-sets at least one of the pre-emphasis gain and the TMDS swing gain to be consistent with the received signal adjustment information. After that, the HDMI signal transmitting end adjusts the HDMI signal according to at least one of the re-set pre-emphasis gain and the re-set TMDS swing gain at operation S1160, and transmits the HDMI signal to the HDMI signal receiving end until the HDMI cable is disconnected.

Figure 12:
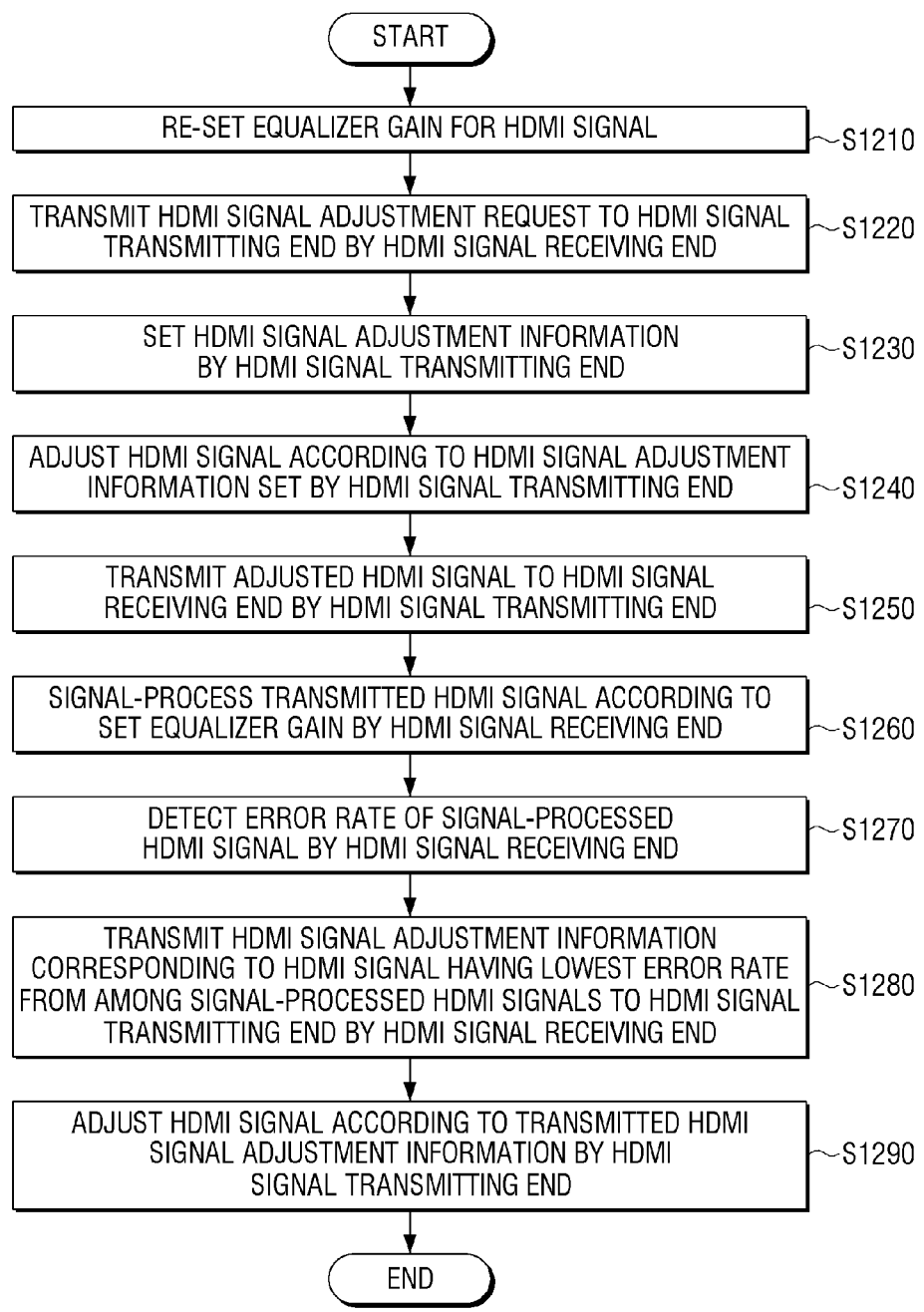
FIG. 12 is a flowchart illustrating an HDMI signal adjusting method according to still another exemplary embodiment.

FIG. 12 is a flowchart illustrating an HDMI signal adjusting method according to still another exemplary embodiment.

FIG. 12 illustrates a series of operations which are performed in the HDMI signal transmitting end and the HDMI signal receiving end.

Referring to FIG. 12, an HDMI signal adjusting method according to still another exemplary embodiment includes setting an equalizer gain for an HDMI signal by the HDMI signal receiving apparatus at operation S1210), transmitting a signal adjustment request to the HDMI signal transmitting apparatus by the HDMI signal receiving apparatus at operation S1220, setting signal adjustment information by the HDMI signal transmitting apparatus in response to the signal adjustment request at operation S1230, adjusting the HDMI signal according to the set signal adjustment information by the HDMI signal transmitting apparatus at operation S1240, and transmitting the adjusted HDMI signal to the HDMI signal receiving apparatus by the HDMI signal transmitting apparatus at operation S1250.

Also, the HDMI signal adjusting method includes signal-processing the HDMI signal according to the set equalizer gain by the HDMI signal receiving apparatus at operation S1260, detecting an error rate of the signal-processed HDMI signal by the HDMI signal receiving apparatus at operation S1270, transmitting signal adjustment information corresponding to an HDMI signal of a lowest error rate from among the signal-processed HDMI signals to the HDMI signal transmitting apparatus by the HDMI signal receiving end at operation S1280, and adjusting the HDMI signal according to the transmitted signal adjustment information by the HDMI signal transmitting apparatus at operation S1290.

Figure 13:
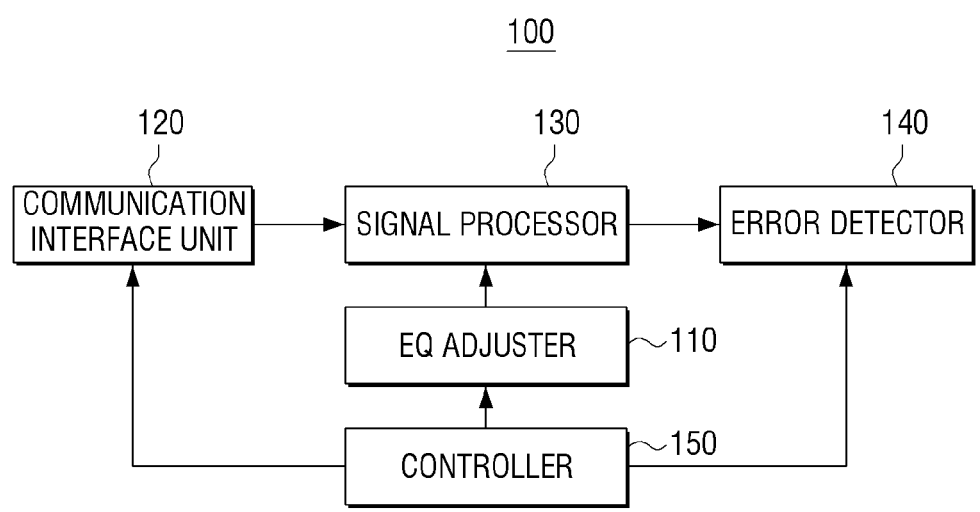
FIG. 13 is a block diagram illustrating an HDMI signal receiving apparatus according to still another exemplary embodiment.

FIG. 13 is a block diagram illustrating an HDMI signal receiving apparatus 100 according to still another exemplary embodiment.

Referring to FIG. 13, an HDMI signal receiving apparatus 100 according to still another exemplary embodiment includes a communication interface unit 120, a signal processor 130, an equalizer (EQ) adjuster 110, an error detector 140, and a controller 150. The HDMI signal receiving apparatus 100 includes all kinds of apparatuses that can receive an HDMI signal from an HDMI signal transmitting apparatus and reproduce the HDMI signal. For example, the HDMI signal receiving apparatus 100 may be implemented as a computer, a DVD player, a TV, a mobile phone, a PDA, a notebook PC, a monitor, a tablet PC, an e-book, an e-album, and a kiosk, as well as many other types of apparatuses.

The EQ adjuster 110 sets an equalizer gain for an HDMI signal. This operation may be performed by changing the equalizer gain by adjusting an equalizer gain level in sequence. When the HDMI signal is adjusted, the equalizer gain may be set to an initial value. That is, a corresponding HDMI signal may be detected by increasing the equalizer gain level from the initial value in sequence.

According to an exemplary embodiment, the equalizing operation disclosed herein includes an operation of reinforcing or cutting an HDMI signal received from an HDMI signal transmitting apparatus and also includes an operation of adjusting a bias signal or changing a charge pump value. In particular, the equalizing gain is related to adjusting jitter. The HDMI signal generally has a characteristic of a high frequency, and it is known that a jitter phenomenon in which a wave deviates or is displaced becomes serious at a high frequency. The jitter may cause flicker of a display monitor, a rattling sound of an audio signal, a loss of data exchanged between network equipment, or other undesirable effects. The jitter phenomenon may be reduced by adjusting sensitivity of a phase locked loop (PLL) by changing settings of the equalizer gain.

As described above, the HDMI signal receiving apparatus 100 may set the equalizer gain as shown in FIG. 2. For example, EQ_Gain_1 is set to obtain a signal magnitude of 0 dB by applying 0x01 to a register. In the next stage for increasing the equalizer gain level (corresponding to EQ_Gain_2), a signal magnitude of 1 dB is obtained by applying 0x02 to the register. In this way, the magnitude of the signal may be changed by increasing the level of the equalizer gain in sequence. However, the values shown in FIG. 2 are merely examples, and the control values and the resulting signal magnitudes (gains) may be set differently. Also, the level may be set by a larger number of stages or a smaller number of stages than the number of stages shown in FIG. 2.

The HDMI signal receiving apparatus 100 includes all kinds of apparatuses that can receive an HDMI signal from an HDMI signal transmitting apparatus and reproduce the HDMI signal. For example, the HDMI signal receiving apparatus may be implemented as a computer, a DVD player, a TV, a mobile phone, a PDA, a notebook PC, a monitor, a table PC, an e-book, an e-album, a kiosk, and various other types of apparatuses.

The communication interface unit 120 exchanges diverse information with an HDMI signal transmitting apparatus, and in particular, receives an HDMI signal which is adjusted according to signal adjustment information set by the HDMI signal transmitting apparatus from the HDMI signal transmitting apparatus. A control signal between the HDMI signal transmitting apparatus and the HDMI signal receiving apparatus 100 may be exchanged using a consumer electronics control (CEC) communication protocol, although is not limited thereto and may also be exchanged using many other types of communication protocols.

The signal processor 130 signal-processes the HDMI signal received through the communication interface unit 120 according to the equalizer gain set by the EQ adjuster 110. As a result, the HDMI signal generated by the HDMI signal transmitting end is signal-processed according to setting of the pre-emphasis gain and/or the TMDS swing gain and is then transmitted to the HDMI signal receiving apparatus 100, and the signal processor 130 of the HDMI signal receiving apparatus 100 signal-processes the received HDMI signal according to the equalizer gain, and completes a series of signal processing operations.

The error detector 140 detects an error rate of the signal-processed HDMI signal. The error rate depends upon an amount of loss of the HDMI signal during the transmitting process of the HDMI signal, and is determined with reference to an initially generated signal. For example, the error rate may be detected by counting a TMDS error. A method for counting a TMDS error may be implemented by a method for detecting at least one of a BCH error and an ECC error of the received HDMI signal, although is not limited thereto and may also be implemented in many other ways.

As described above, FIG. 5 is a reference view illustrating information provided by a register which counts errors detected by an ECC memory and stores the errors. In general, the ECC memory detects an error if an overcurrent is generated around the memory or if a bit value is changed by other external influences. FIG. 5 illustrates a result of counting bits in which an ECC error is detected as information of 2 bytes by the ECC memory.

The controller 150 controls an overall operation of the HDMI signal receiving apparatus, and in particular, transmits signal adjustment information corresponding to an HDMI signal having a lowest error rate detected by the error detector 140 from among the signal-processed HDMI signals to the HDMI signal transmitting apparatus.

The operations of the above-described elements will be explained in sequence. First, the EQ adjuster 110 sets the equalizer gain to an initial value, and the communication interface unit 120 requests the HDMI signal transmitting apparatus to set the pre-emphasis gain to an initial value (for example, 1) through a CEC protocol. When the HDMI signal transmitting apparatus sets the pre-emphasis gain to the initial value and transmits a response through the CEC protocol, the communication interface unit 120 requests the HDMI signal transmitting apparatus to set the TMDS swing gain to an initial value through the CEC protocol. When a response indicating that the TMDS swing gain is set to the initial value is received from the HDMI signal transmitting apparatus, the HDMI signal receiving apparatus then receives the adjusted HDMI signal. The signal processor 130 signal-processes the received HDMI signal according to the equalizer gain, and the error detector 140 detects an error rate of the signal-processed HDMI signal.

By repeating the signal processing operation and the error rate detecting operation described above, the controller 150 finds an HDMI signal having a lowest error rate from among the signal-processed HDMI signals. The communication interface unit 120 transmits signal adjustment information corresponding to the found HDMI signal to the HDMI signal transmitting end. As described above, the signal adjustment information may be the set pre-emphasis gain and/or the TMDS swing gain. In this case, the setting values of the pre-emphasis gain and/or the TMDS swing gain are transmitted to the HDMI signal transmitting end. According to an exemplary embodiment, the CEC communication protocol may be used to transmit the signal adjustment information, although it is understood that many other types of communication protocols may also be used according to other exemplary embodiments.

When the signal processing operation and the error rate detecting operation are repeated as described above, a table containing the signal adjustment information set in each operation and the error rate corresponding to the signal adjustment information may be generated. The HDMI signal receiving end identifies signal adjustment information having a lowest error rate with reference to the table. FIG. 6 illustrates an example of such a table.

In the same way as in the above-described exemplary embodiment of FIG. 6, error rates which are obtained when the equalizer gain level is 1, the pre-emphasis gain level is 1, and the TMDS swing gain levels are 1 to 8 are stored in a memory, error rates which are obtained when the equalizer gain level is 1, the pre-emphasis gain level is 2, and the TMDS swing gain levels are 1 to 8, and so forth through each combination, are stored in the memory. In this way, the error rates are checked by combining the setting values of the equalizer gain, the pre-emphasis gain, and the TMDS swing gain. Although the equalizer gain level, the pre-emphasis gain level, and the TMDS swing gain level are set to 1 to 8 (see FIGS. 2 to 6) in the above-described exemplary embodiments, the number of levels may be reduced or increased according to various criteria, such as, for example, a specification of a product. The controller 150 of the HDMI signal receiving apparatus 100 identifies signal adjustment information having a lowest error rate stored in the memory with reference to the table of FIG. 6.

Figure 14:
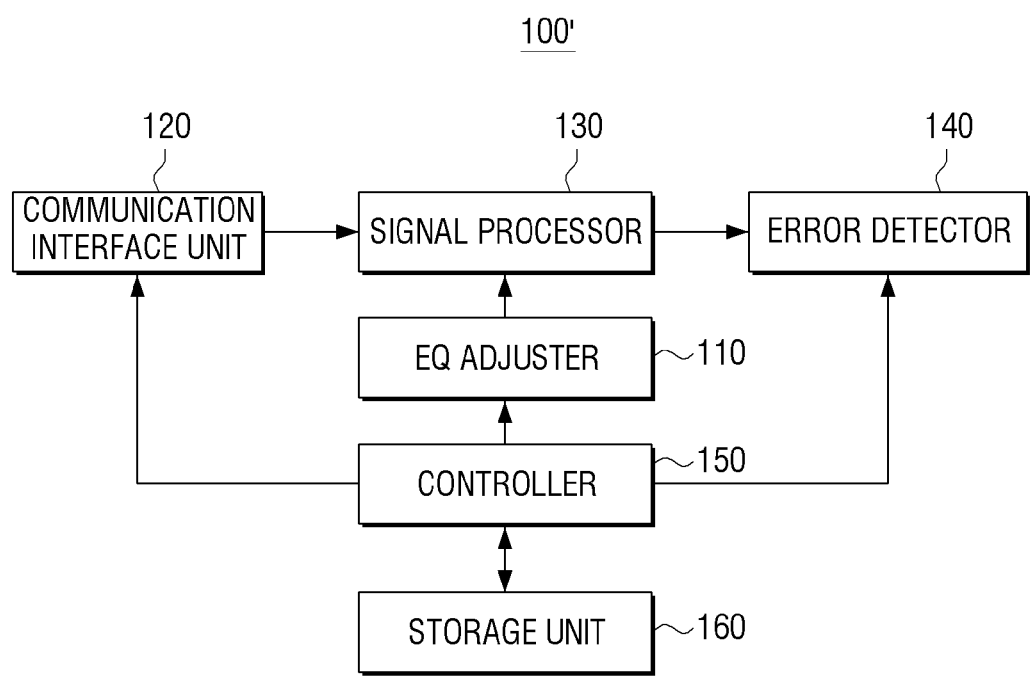
FIG. 14 is a block diagram illustrating an HDMI signal receiving apparatus according to still another exemplary embodiment.

FIG. 14 is a block diagram illustrating an HDMI signal receiving apparatus 100 according to still another exemplary embodiment.

Referring to FIG. 14, in comparison with the exemplary embodiment shown in FIG. 13, an HDMI signal receiving apparatus 100' according to still another exemplary embodiment may further include a storage unit 160 which stores an equalizer gain, signal adjustment information, and an error rate corresponding to the signal adjustment information. The storage unit 160 may be implemented as many different types of storage media that can store data, such as a memory, a hard disk, a universal serial bus (USB) external memory, an external disk driver, a CD-ROM, a cache memory, a floppy disk, a tape, a film, etc.

According to an exemplary embodiment, the controller 150 reads out signal adjustment information corresponding to a detected lowest error rate from the storage unit 160, and transmits the signal adjustment information to an HDMI signal transmitting apparatus 200.

Figure 15:
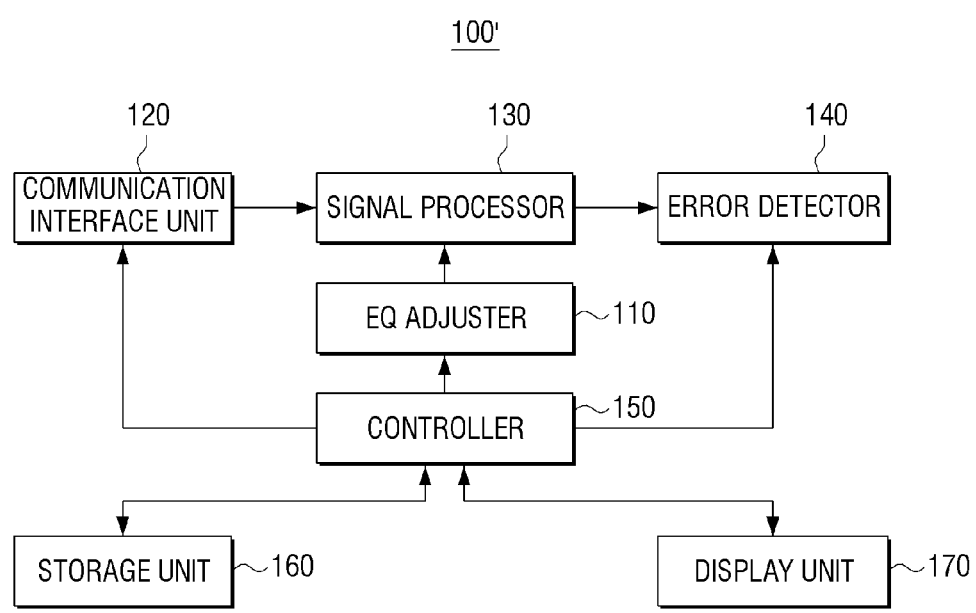
FIG. 15 is a block diagram illustrating an HDMI signal receiving apparatus according to still another exemplary embodiment.

However, even when the signal adjustment information corresponding to the lowest error rate is identified through the above-described process, this error rate may not guarantee a minimum quality that is required by the HDMI signal receiving apparatus 100. For example, when an HDMI cable is excessively elongated for connection or when signal leakage is severe due to deterioration, even the HDMI signal corresponding to the lowest error rate may not guarantee high quality information. In this case, it is necessary to inform a user that the HDMI cable should be replaced or newly installed. FIG. 15 suggests still another exemplary embodiment to solve this problem.

FIG. 15 is a block diagram illustrating an HDMI signal receiving apparatus 100' according to still another exemplary embodiment.

Referring to FIG. 15, in comparison with the exemplary embodiment shown in FIG. 14, an HDMI signal receiving apparatus 100' according to still another exemplary embodiment may further include a display unit 170.

The display unit 170 decodes an HDMI signal and outputs video information. The display unit 170 may be implemented as many different types, including, for example, a liquid crystal display (LCD), a plasma display, etc.

When a lowest error rate detected from the signal-processed signal is greater than or equal to a predetermined value, the controller 150 may control the display unit 170 to output a message requesting replacement of an HDMI cable.

When the HDMI signal receiving apparatus 100 is a television (TV) according to an exemplary embodiment, and the lowest error rate detected from the signal-processed HDMI signal is greater than or equal to a predetermined value, the display unit 170 displays a message indicating that the HDMI cable should be replaced on a screen of the TV.

According to still another exemplary embodiment, the HDMI signal receiving apparatus may further include a mechanism for automatically adjusting an HDMI signal (not shown). For instance, when the HDMI signal receiving apparatus is a TV, the HDMI signal receiving apparatus may include a button on a remote controller so that a consumer can automatically perform the above-described signal adjusting operation directly through the remote controller. When a plurality of apparatuses are connected through the HDMI cable, the consumer may adjust the HDMI signal simply by using the button without any assistance of an expert.

Figure 16:
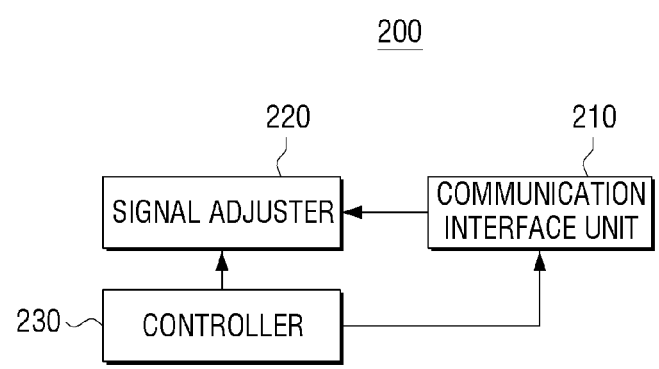
FIG. 16 is a block diagram illustrating an HDMI signal transmitting apparatus according to still another exemplary embodiment.
Figure 17:
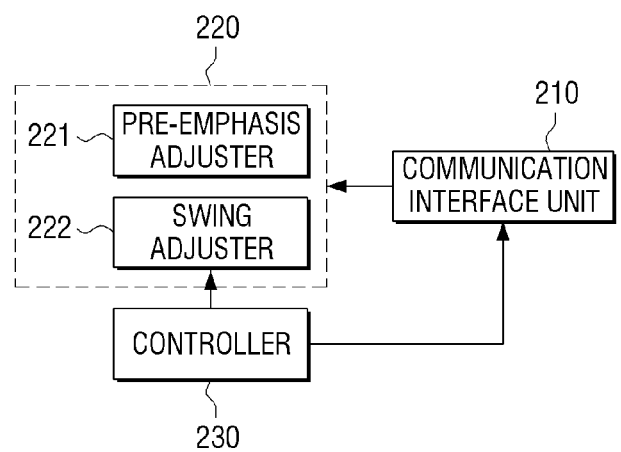
FIG. 17 is a block diagram illustrating an HDMI signal transmitting apparatus in which a signal adjuster of FIG. 16 includes a pre-emphasis adjuster and a swing adjuster.

FIG. 16 is a block diagram illustrating an HDMI signal transmitting apparatus 200 according to still another exemplary embodiment, and FIG. 17 is a block diagram illustrating the HDMI signal transmitting apparatus 200 of FIG. 16 and further illustrating a pre-emphasis adjuster 221 and a swing adjuster 222 included in the signal adjuster 220 of FIG. 16.

Referring to FIG. 16, the HDMI signal transmitting apparatus 200 according to still another exemplary embodiment includes a communication interface unit 210, a signal adjuster 220, and a controller 230.

The communication interface unit 210 exchanges information with the HDMI signal receiving apparatus 100, and in particular, transmits an HDMI signal which is adjusted according to signal adjustment information set by the HDMI signal transmitting apparatus 200 to the HDMI signal receiving apparatus 100. In particular, a control signal between the HDMI signal transmitting apparatus 200 and the HDMI signal receiving apparatus 100 may be exchanged using a CEC communication protocol, although is not limited thereto and may be exchanged using other communication protocols as well according to other exemplary embodiments.

The signal adjuster 220 adjusts a signal when a signal adjustment request is received from the HDMI signal receiving apparatus 100 through the communication interface unit 210. When the signal adjustment request is received from the HDMI signal receiving apparatus 100, the signal adjuster 220 sets signal adjustment information. The signal adjuster 220 adjusts the HDMI signal according to the set signal adjustment information. As described above, the HDMI signal is adjusted by changing at least one of a pre-emphasis gain and a TMDS swing gain. To achieve this, the signal adjuster 220 may include a pre-emphasis adjuster 221 (a pre-emphasis gain adjustor) and a swing adjuster 222 as shown in FIG. 17.

After that, as described above, the HDMI signal receiving apparatus 100 signal-processes the HDMI signal received from the HDMI signal transmitting apparatus 200 according to the equalizer gain set by the HDMI signal receiving apparatus 100, and detects an error rate. By repeating the signal-processing operation and the error rate detecting operation, an error rate table in which an error rate is changed according to signal adjustment information is generated. The HDMI signal receiving apparatus 100 transmits signal adjustment information corresponding to an HDMI signal having a lowest error rate.

The controller 230 controls an overall operation of the HDMI signal transmitting apparatus 200. In particular, the controller 230 controls the communication interface unit 210 to transmit the HDMI signal which is adjusted by the signal adjuster 220 to the HDMI signal receiving apparatus 100, and, when signal adjustment information corresponding to the HDMI signal having the lowest error rate is received from the HDMI signal receiving apparatus 100, controls the signal adjuster 220 to adjust the HDMI signal according to the received signal adjustment information. When the signal adjuster 220 re-sets the signal adjustment information to be consistent with the received signal adjustment information, the communication interface unit 210 transmits the HDMI signal adjusted according to the re-set signal adjustment information to the HDMI signal receiving apparatus 100 until the HDMI cable is disconnected.

Figure 18:
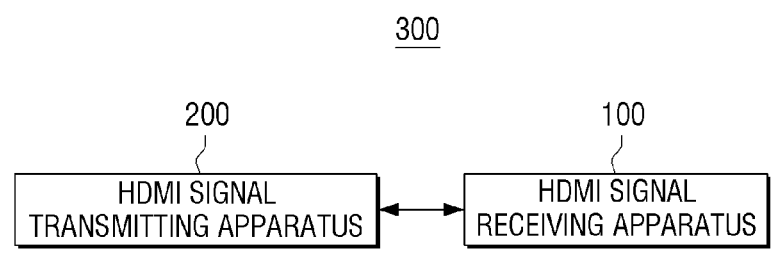
FIG. 18 is a block diagram illustrating an HDMI signal processing system according to still another exemplary embodiment.

FIG. 18 is a block diagram illustrating an HDMI signal processing system 300 according to still another exemplary embodiment.

Referring to FIG. 18, an HDMI signal processing system 300 according to still another exemplary embodiment includes an HDMI signal receiving apparatus 100 which sets an equalizer gain for an HDMI signal, receives an adjusted HDMI signal from an HDMI signal transmitting apparatus 200, processes the HDMI signal according to the set equalizer gain, and transmits signal adjustment information corresponding to an HDMI signal having a lowest error rate from among the signal-processed HDMI signals to the HDMI signal transmitting apparatus 200, and the HDMI signal transmitting apparatus 200 which adjusts the HDMI signal and transmits the adjusted HDMI signal to the HDMI signal receiving apparatus 100, adjusts the HDMI signal according to the signal adjustment information corresponding to the HDMI signal having the lowest error rate, and re-transmits the HDMI signal to the HDMI signal receiving apparatus 100.

The HDMI signal receiving apparatus 100 and the HDMI signal transmitting apparatus 200 have been described above with respect to several exemplary embodiments, and thus, a detailed description thereof is omitted.

Figure 19:
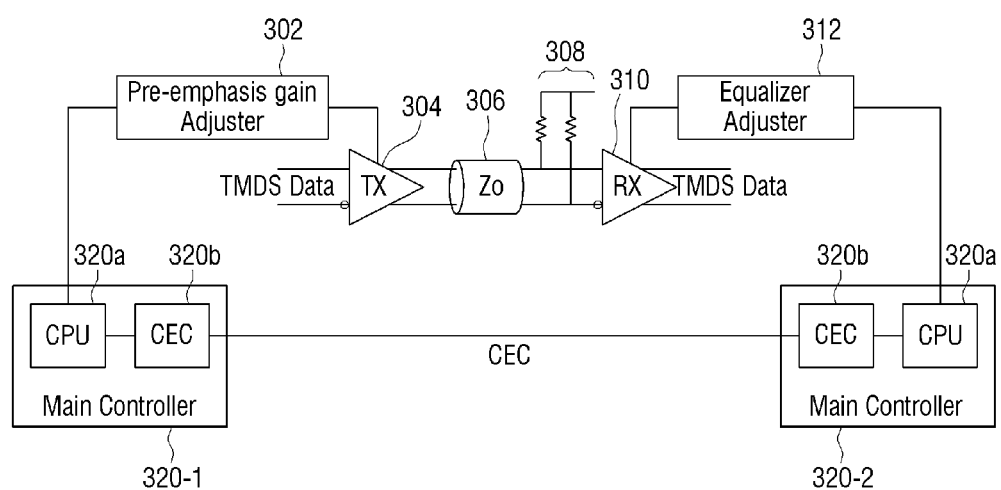
FIG. 19 is a reference view illustrating a schematic circuit for the HDMI signal processing system of FIG. 18.

FIG. 19 is a reference view illustrating a schematic circuit of the HDMI signal processing system 300 of FIG. 18. As shown in FIG. 19, the schematic circuit includes a pre-emphasis gain adjuster 302, a transmitter 304, a cable 306 (e.g., HDMI cable) which has a characteristic cable impedence Zo, a plurality of resistors 308, a receiver 310, an equalizer adjuster 312, and a plurality of main controllers 320-1 and 320-2. Each of the plurality of main controllers 320 includes a CPU 320 and a CEC controller 320b. The components shown in FIG. 19 may be used in accordance with various of the different exemplary embodiments described above. It is understood that the configuration shown in FIG. 19 is exemplary only, and that the schematic circuit of the HDMI signal processing system 300 may be configured in many different ways according to other exemplary embodiments.

As described above, the communication interface between the HDMI signal receiving apparatus 100 and the HDMI signal transmitting apparatus 200 of the HDMI signal processing system 300 may be configured to use a CEC protocol.

As described above, exemplary embodiments can remove a noise which occurs during the HDMI signal transmitting process, and automatically adjust the HDMI signal so that a problem of incompatibility of an HDMI cable can be minimized. Also, according to exemplary embodiments, the automatic signal adjusting function is provided in the HDMI apparatus, so that the user can easily adjust the signal and set an optimal signal exchanging environment. In particular, the signal is adjusted by controlling a gain of the signal without adjusting resolution separately, so that deterioration of resolution can be minimized.

The foregoing exemplary embodiments and advantages are merely exemplary and are not to be construed as limiting any of the concepts disclosed herein. The exemplary embodiments can be readily applied to other types of apparatuses. Furthermore, although the above-described exemplary embodiments are described as being applicable to HDMI signal transmissions, other exemplary embodiments are not limited thereto, and may be applied to other types of signal transmissions instead of or in addition to HDMI signal transmissions. Also, the description of the exemplary embodiments is intended to be illustrative, and not to limit the scope of the claims, and many alternatives, modifications, and variations will be apparent to those skilled in the art.

What is claimed is:

1. A method for adjusting a high definition multimedia interface (HDMI) signal of an HDMI signal receiving apparatus, the method comprising:
   setting an equalizer gain for an HDMI signal;
   receiving an HDMI signal which is adjusted according to signal adjustment information set by an HDMI signal transmitting apparatus from the HDMI signal transmitting apparatus;
   signal-processing the received HDMI signal according to the set equalizer gain;
   detecting an error rate of the signal-processed HDMI signal; and
   transmitting signal adjustment information corresponding to an HDMI signal having a lowest error rate from among a plurality of the signal-processed HDMI signals corresponding to a plurality of different combinations of the equalizer gain and the signal adjustment information to the HDMI signal transmitting apparatus,
   wherein the method further comprises storing, for each combination of the equalizer gain and the signal adjustment information, the equalizer gain, the signal adjustment information, and the error rate corresponding to the signal adjustment information, and
   wherein the transmitting comprises transmitting the signal adjustment information corresponding to the HDMI signal having the lowest error rate from among the stored error rates to the HDMI signal transmitting apparatus.

2. The method as claimed in claim 1, wherein the setting the equalizer gain comprises setting the equalizer gain by changing the equalizer gain by adjusting an equalizer gain level in sequence.

3. The method as claimed in claim 1, wherein the HDMI signal is adjusted by changing at least one of a pre-emphasis gain and a transition minimized differential signaling (TMDS) swing gain.

4. The method as claimed in claim 1, further comprising transmitting a signal adjustment request to the HDMI signal transmitting apparatus,
   wherein, the transmitting of the signal adjustment request causes the HDMI signal transmitting apparatus to adjust the HDMI signal.

5. The method as claimed in claim 1, wherein the detecting the error rate comprises detecting the error rate by counting a TMDS error.

6. The method as claimed in claim 5, wherein the TMDS error is at least one of a Bose, Chaudri, Hocquenghem Code (BCH) error and an error check and correct memory (ECC) error.

7. The method as claimed in claim 1, further comprising, when the lowest error rate detected from the signal-processed HDMI signals is greater than or equal to a predetermined value, outputting a message requesting replacement of an HDMI cable which transmits the HDMI signal.

8. A method for adjusting a high definition multimedia interface (HDMI) signal of an HDMI signal transmitting apparatus, the method comprising:
   setting signal adjustment information;
   adjusting an HDMI signal according to the set signal adjustment information;
   transmitting the adjusted HDMI signal to an HDMI signal receiving apparatus;
   receiving signal adjustment information corresponding to an HDMI signal having a lowest error rate among a plurality of the HDMI signals corresponding to a plurality of different combinations of equalizer gain, signal adjustment information, and an error rate corresponding to the signal adjustment information, from the HDMI signal receiving apparatus, the HDMI signal receiving apparatus storing the plurality of different combinations; and adjusting the HDMI signal according to the received signal adjustment information.

9. The method as claimed in claim 8, wherein the HDMI signal is adjusted by changing at least one of a pre-emphasis gain and a transition minimized differential signaling (TMDS) swing gain.

10. The method as claimed in claim 8, wherein the error rate is detected by counting at least one of a Bose, Chaudri, Hocquenghem Code (BCH) error and an error check and correct memory (ECC) error.

11. A method for adjusting a high definition multimedia interface (HDMI) signal, the method comprising:
    setting, by an HDMI signal receiving apparatus, an equalizer gain for an HDMI signal;
    transmitting, by the HDMI signal receiving apparatus, a signal adjustment request to an HDMI signal transmitting apparatus;
    in response to receiving the signal adjustment request, setting, by the HDMI signal transmitting apparatus, signal adjustment information;
    adjusting, by the HDMI signal transmitting apparatus, an HDMI signal according to the set signal adjustment information;
    transmitting, by the HDMI signal transmitting apparatus, the adjusted HDMI signal to the HDMI signal receiving apparatus;
    signal-processing, by the HDMI signal receiving apparatus, the transmitted HDMI signal according to the set equalizer gain;
    detecting, by the HDMI signal receiving apparatus, an error rate of the signal-processed HDMI signal;
    transmitting, by the HDMI signal receiving apparatus, the signal adjustment information corresponding to an HDMI signal having a lowest error rate from among a plurality of the signal-processed HDMI signals corresponding to a plurality of different combinations of the equalizer gain and the signal adjustment information to the HDMI signal transmitting apparatus; and
    adjusting, by the HDMI signal transmitting apparatus, the HDMI signal according to the transmitted signal adjustment information,
    wherein the method further comprises storing, by the HDMI signal receiving apparatus, for each combination of the equalizer gain and the signal adjustment information, the equalizer gain, the signal adjustment information, and the error rate corresponding to the signal adjustment information, and
    wherein the transmitting, by the HDMI signal receiving apparatus, the signal adjustment information corresponding to the HDMI signal having the lowest error rate comprises transmitting the signal adjustment information corresponding to the HDMI signal having the lowest error rate from among the stored error rates to the HDMI signal transmitting apparatus.

12. The method as claimed in claim 11, wherein the adjusting the HDMI signal comprises adjusting the HDMI signal by changing at least one of a pre-emphasis gain and a transition minimized differential signaling (TMDS) swing gain.

13. A high definition multimedia interface (HDMI) signal receiving apparatus comprising:
    an equalizer (EQ) adjuster which sets an equalizer gain for an HDMI signal;
    a communication interface unit which receives an HDMI signal which is adjusted according to signal adjustment information set by an HDMI signal transmitting apparatus from the HDMI signal transmitting apparatus;
    a signal processor which signal-processes the HDMI signal received through the communication interface unit according to the equalizer gain set by the EQ adjuster;
    an error detector which detects an error rate of the signal-processed HDMI signal; and
    a controller which controls the communication interface unit to transmit the signal adjustment information corresponding to an HDMI signal having a lowest error rate detected by the error detector from among a plurality of the signal-processed HDMI signals corresponding to a plurality of different combinations of the equalizer gain and the signal adjustment information to the HDMI signal transmitting apparatus,
    wherein the HDMI signal receiving apparatus further comprises a storage which stores, for each combination of the equalizer gain and the signal adjustment information, the equalizer gain, the signal adjustment information, and the error rate corresponding to the signal adjustment information, and
    wherein the controller controls the communication interface unit to transmit the signal adjustment information corresponding to the HDMI signal having the lowest error rate from among the stored error rates to the HDMI signal transmitting apparatus.

14. The HDMI signal receiving apparatus as claimed in claim 13, wherein the EQ adjuster sets the equalizer gain by changing the equalizer gain by adjusting an equalizer gain level in sequence.

15. The HDMI signal receiving apparatus as claimed in claim 13, wherein the communication interface unit receives the HDMI signal which is adjusted by changing at least one of a pre-emphasis gain and a transition minimized differential signaling (TMDS) swing gain.

16. The HDMI signal receiving apparatus as claimed in claim 13, further comprising a display unit,
    wherein, when the lowest error rate detected from the signal-processed HDMI signals is greater than or equal to a predetermined value, the controller controls the display unit to output a message requesting replacement of an HDMI cable which transmits the HDMI signal.

17. A high definition multimedia interface (HDMI) signal transmitting apparatus comprising:
    a communication interface unit which exchanges information with an HDMI signal receiving apparatus;
    a signal adjuster which, when a signal adjustment request is received from the HDMI signal receiving apparatus through the communication interface unit, adjusts an HDMI signal; and
    a controller which controls the communication interface unit to transmit the HDMI signal adjusted by the signal adjuster to the HDMI signal receiving apparatus, and, when signal adjustment information corresponding to an HDMI signal having a lowest error rate from among a plurality of HDMI signals corresponding to a plurality of different combinations of equalizer gain, signal adjustment information, and an error rate corresponding to the signal adjustment information is received from the HDMI signal receiving apparatus comprising a storage which stores the plurality of different combinations, controls the signal adjuster to adjust the HDMI signal according to the received signal adjustment information.

18. An HDMI signal processing system comprising:
an HDMI signal receiving apparatus which sets an equalizer gain for an HDMI signal, receives an adjusted HDMI signal from an HDMI signal transmitting apparatus, signal-processes the received HDMI signal according to the set equalizer gain, and transmits signal adjustment information corresponding to an HDMI signal having a lowest error rate from among a plurality of the signal-processed HDMI signals corresponding to a plurality of different combinations of the equalizer gain and the signal adjustment information to the HDMI signal transmitting apparatus, the HDMI signal receiving apparatus storing, for each combination of the equalizer gain and the signal adjustment information, the equalizer gain, the signal adjustment information, and the error rate corresponding to the signal adjustment information, and transmitting the signal adjustment information corresponding to the HDMI signal having the lowest error rate from among the stored error rates; and
the signal transmitting apparatus which adjusts the HDMI signal and transmits the HDMI signal to the HDMI signal receiving apparatus, adjusts the HDMI signal according to the signal adjustment information corresponding to the HDMI signal having the lowest error rate, and re-transmits the HDMI signal to the HDMI signal receiving apparatus.

19. A method for determining an optimal high definition multimedia interface (HDMI) signal, the method comprising:
changing, at an HDMI transmitter, a characteristic of each of a plurality of HDMI signals to generate a plurality of unique HDMI signals;
transmitting the plurality of unique HDMI signals from the HDMI transmitter to an HDMI receiver;
determining, at the HDMI receiver, an optimal HDMI signal from the plurality of transmitted unique HDMI signals; and
transmitting information related to the optimal HDMI signal from the HDMI receiver to the HDMI transmitter,
wherein the method further comprises storing, at the HDMI receiver, the plurality of the unique HDMI signals and error rates corresponding to the plurality of the unique HDMI signals, and
wherein the transmitting of the information related to the optimal HDMI signal comprises transmitting the information related to the optimal HDMI signal, which corresponds to a lowest error rate from among the stored error rates, to the HDMI transmitter.

20. The method according to claim 19, wherein the changing of the characteristic comprises changing at least one of a pre-emphasis gain and a transition minimized differential signaling (TMDS) swing gain.

21. The method according to claim 19, wherein the determining of the optimal HDMI signal comprises detecting the error rate of each of the transmitted unique HDMI signals and identifying an HDMI signal having the lowest detected error rate as the optimal HDMI signal.

22. The method according to claim 19, wherein the transmitting of the information comprises transmitting signal adjustment information which enables the HDMI transmitter to transmit the optimal HDMI signal.

23. The method according to claim 21, further comprising, when the lowest detected error rate is above a threshold, indicating that an HDMI cable which transmits the HDMI signals should be replaced.

24. The method according to claim 19, wherein the transmitting of the plurality of unique HDMI signals comprises transmitting the plurality of unique HDMI signals using a consumer electronics control (CEC) communication protocol.

25. A method for determining an optimal high definition multimedia interface (HDMI) signal, the method comprising:
processing, at an HDMI receiver, a plurality of HDMI signals according to a corresponding plurality of equalizer gain values;
determining, at the HDMI receiver, an optimal HDMI signal from among the plurality of processed HDMI signals; and
transmitting information related to the optimal HDMI signal from the HDMI receiver to an HDMI transmitter,
wherein the method further comprises storing, at the HDMI receiver, the plurality of equalizer gain values and error rates corresponding to the plurality of the equalizer gain values, and
wherein the transmitting of the information related to the optimal HDMI signal comprises transmitting the information related to the optimal HDMI signal, which corresponds to a lowest error rate from among the stored error rates, to the HDMI transmitter.

26. The method according to claim 25, wherein the determining of the optimal HDMI signal comprises detecting the error rate of each of the processed HDMI signals and identifying an HDMI signal having the lowest detected error rate as the optimal HDMI signal.

27. The method according to claim 25, wherein the transmitting of the information comprises transmitting signal adjustment information which enables the HDMI transmitter to transmit the optimal HDMI signal.

28. The method according to claim 26, further comprising, when the lowest detected error rate is above a threshold, indicating that an HDMI cable which transmits the HDMI signals should be replaced.

* * * * *